United States Patent
Yoshikawa et al.

[11] Patent Number: 5,743,513
[45] Date of Patent: Apr. 28, 1998

[54] DIAPHRAGM VALVE

[75] Inventors: Kazuhiro Yoshikawa; Tetsuya Kojima, both of Osaka, Japan

[73] Assignee: Fujikin Incorporated, Osaka, Japan

[21] Appl. No.: 584,072

[22] Filed: Jan. 11, 1996

[30] Foreign Application Priority Data

Feb. 15, 1995 [JP] Japan .................................. 7-027136

[51] Int. Cl.⁶ .................................................. F16K 31/44
[52] U.S. Cl. .................................. 251/335.2; 251/335.1
[58] Field of Search ........................... 251/335.2, 335.1

[56] References Cited

U.S. PATENT DOCUMENTS

| | | | |
|---|---|---|---|
| 4,231,549 | 11/1980 | Visalli | 251/335.2 |
| 4,867,201 | 9/1989 | Carjen | 251/335.2 |
| 5,295,662 | 3/1994 | Yamaji et al. | 251/335.2 |
| 5,624,102 | 4/1997 | Nishimura et al. | 251/335.2 |

FOREIGN PATENT DOCUMENTS 6-80958  11/1994  Japan .

Primary Examiner—A. Michael Chambers
Attorney, Agent, or Firm—Griffin, Butler Whisenhunt & Kurtossy

[57] ABSTRACT

A diaphragm valve comprises: a body (1) having an inflow passage (1a), an outflow passage (1b), a concave valve chamber (1c) and a valve seat (1d); a metallic main diaphragm (2) which holds airtightness of the valve chamber (1c) and makes contact with and separates from the valve set (1d) directly or indirectly; a bonnet (4) which securely holds an outer circumferential edge portion of the main diaphragm (2) between the body 1 and the bonnet 4; and a stem 5 which causes the main diaphragm (2) to be deformed elastically. At the top surface side of the aforementioned main diaphragm (2) there is arranged a metallic sub-diaphragm (3) whose outer circumferential edge portion can be elastically deformed in a vertical direction. A center portion of the aforementioned sub-diaphragm (3) is fixed to a center portion of the main diaphragm (2), so that the sub-diaphragm (3) comes in contact with the top surface side of the main diaphragm (2) to support a bend thereof when the main diaphragm is deformed elastically.

6 Claims, 10 Drawing Sheets

DIAPHRAGM VALVE

BACKGROUND OF THE INVENTION

This invention relates to a diaphragm valve of a type used in fluid pipelines of semiconductor manufacturing plants, nuclear power plants, medicine and food manufacturing installations and the like, and more particularly to a type of diaphragm valve which enhances durability of metallic diaphragms thereof.

In pipelines which generally handle gases of high purity, such as pipelines for semiconductor manufacturing plants, diaphragm valves, which are sealed by metallic diaphragms, are used extensively.

A conventionally-structured diaphragm valve of this type (a disk type diaphragm valve) is disclosed in the Official Gazette of Provisional Publication No. 80958/94, for example.

Namely, as shown in FIG. 9 hereof, the aforementioned diaphragm valve comprises: a body 20 having an inflow passage 20a, an outflow passage 20b, a valve chamber 20c and a valve seat 20d; a bonnet 22 installed on the body 20 by means of a plurality of bolts and nuts 21; a stem 23 screwed to, supported by and movable up and down in the bonnet 22; a handle 24 installed on a top end portion of the stem 23; a valve holder 25 rotatably fitted at a bottom end portion of the stem 23; a disk 26 welded to the valve holder 25; a disk packing 28 attached to the disk 26 by means of a packing holder 27; a supporting metal fitting 29 fitted on the stem 23; and a metallic diaphragm 31 with an outer circumferential edge portion thereof being held between the body 20 and the bonnet 22 a by gasket(s) 30 with the inner circumferential edge portion thereof being clamped between the valve holder 25 and the supporting metal fitting 29 and welded to the valve holder 25 and the supporting metal fitting 29.

Because the valve holder 25, an inner edge portion of an inner circumference of the supporting metal fitting 29 and an inner edge portion defining an inner circumference of the metallic diaphragm 31 are welded about the circumference thereof in order to fix and integrate these three, this diaphragm valve possesses excellent features in that leakage of fluid from the inner circumferential edge portion of the metallic diaphragm 31 is reliably prevented.

Because the aforementioned diaphragm valve is constructed so that a bend of the diaphragm 31 is supported by the supporting metal fitting 29 when the diaphragm 31 is elastically deformed downwardly, as shown in FIG. 10, it is possible to relieve bending stress, generated while the diaphragm 31 is bent, from being applied directly to the weld zone.

However, because the aforementioned supporting metal fitting 29 is rigid, this diaphragm 31 will be deformed forcibly to make contact with a bottom surface of the supporting metal fitting 29. As a result, excessive stress is still applied to the diaphragm 31, and there has been a problem in that cracks have formed in the diaphragm after repeated operations for thousands of times, thereby reducing a useful life of the diaphragm 31. Because the metallic diaphragm 31 is made from very thin metallic plate of 0.1 to 0.2 mm thickness (stainless steel plate, for example), the aforementioned problem is particularly aggravated further.

It is an object of this invention to solve the problems set forth above and to provide a diaphragm valve which improves the durability of its metallic diaphragm.

SUMMARY

According to principles of this invention, a diaphragm valve comprises: a body 1 (reference numbers corresponding to those of the embodiments described below are provided to make this summary clearer) having a valve seat 1d at a bottom of a concave valve chamber 1c, an inflow passage 1a and an outflow passage 1b; a metallic main diaphragm 2 which is arranged in the valve chamber 1c opposite the valve seat 1d in order to maintain air tightness of the valve chamber 1c and which is deformed elastically in a vertical direction in order to make contact, directly or indirectly, with the valve seat 1d; a bonnet 4 fixed to the body 1 to securely hold an outer circumferential edge portion of the main diaphragm 2 against the body 1; and a stem 5 inserted to freely move up and down through, and be supported by, the bonnet 4 in order to elastically deform the main diaphragm 2; wherein a metallic sub-diaphragm 3 is arranged on a top surface of the main diaphragm 2 with an outer circumferential edge portion thereof being elastically deformable in a vertical direction, a center portion edge thereof being fixed at a center portion edge of the main diaphragm 2, so that the sub-diaphragm 3 is caused to make contact with the top surface of the main diaphragm 2 to support a bend in the main diaphragm 2 when it is deformed elastically.

Radial slits 3b, spaced at equal angles, may be formed at the outer circumferential edge portion of the sub-diaphragm 3.

Further, the sub-diaphragm 3 may be constructed of a plurality of metallic plates laid one on another.

When the stem 5 is lowered, the center portion of the main diaphragm 2 is pushed downward so that the main diaphragm is gradually deformed elastically. Along with this deformation, a bottom surface of the sub-diaphragm 3 gradually comes into contact with the top surface of the main diaphragm 3, so that the sub-diaphragm 3 will support the bend in the main diaphragm 2. At this time, because the outer circumferential edge portion of the sub-diaphragm 3 is gradually deformed elastically in the upward direction, the main diaphragm 2 will not be deformed forcibly. As a result, there will be no excessive stress applied to the main diaphragm 3, and the useful life of the main diaphragm 2 will be extended.

When the stem 5 is lowered by a fixed stroke, the main diaphragm 2 comes in contact directly or indirectly (via an attached disk 7) with the valve seat, thereby closing communication between the inflow passage and the outflow passage.

On the other hand, when the stem 5 is raised, the main diaphragm 2 gradually returns to an initial shape thereof due to elastic forces and the sub-diaphragm 3 also gradually returns to its initial shape due to elastic forces thereof.

BRIEF DESCRIPTION OF THE DRAWING

The accompanying drawings, which are incorporated in and constitute a part of the specification, illustrate a preferred embodiment of the present invention, and together with a general description of the preferred embodiment given below, serve to explain details and principles of the invention.

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
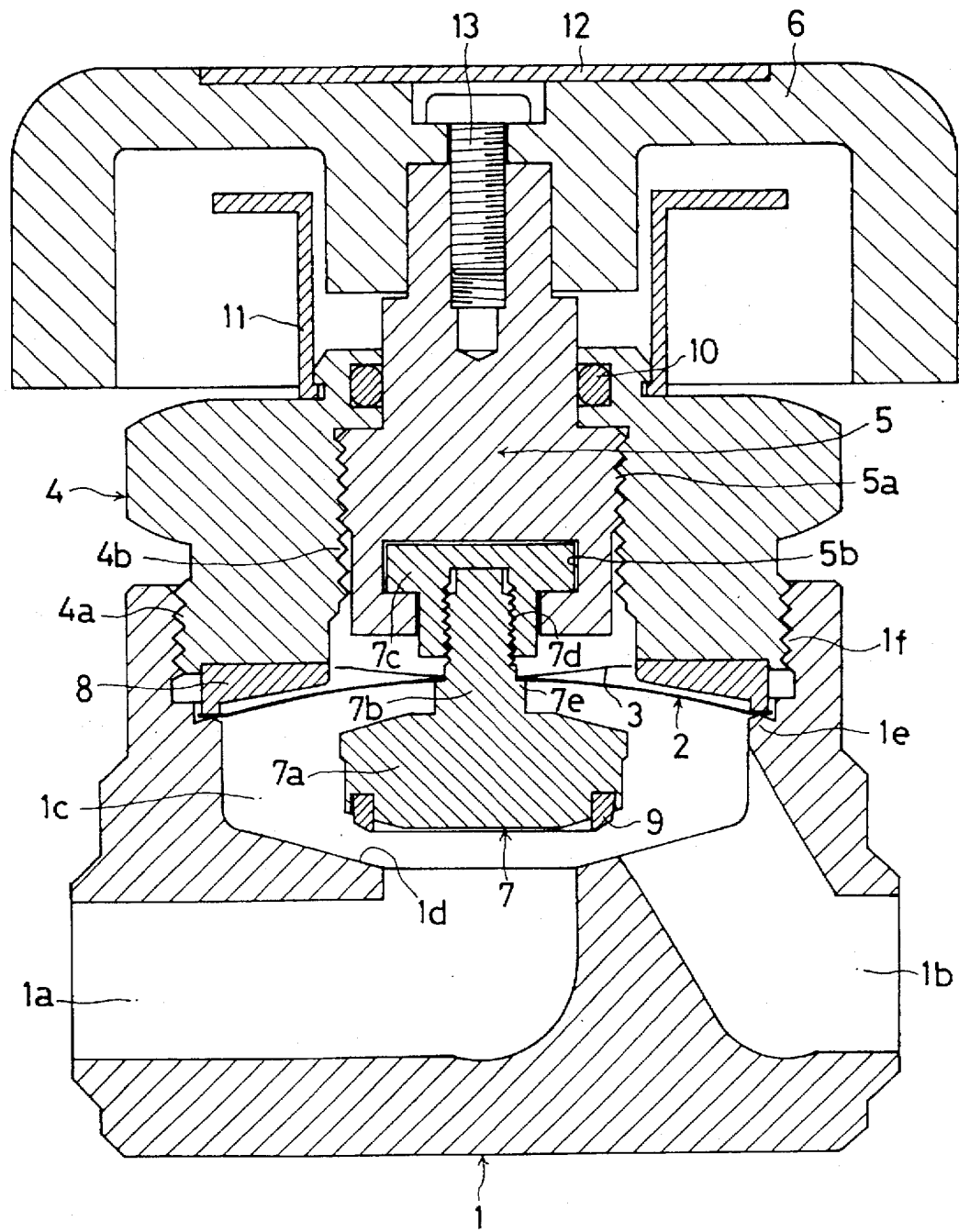
FIG. 1 is a longitudinal cross-sectional view of a diaphragm valve of a first embodiment according to the present invention.

FIG. 1 is a longitudinal sectional view of a diaphragm valve according to a first embodiment of the present invention, in which a diaphragm valve is composed of a body 1, a metallic main diaphragm 2, a metallic sub-diaphragm 3, a bonnet 4, a stem 5, a handle 6 and a disk 7 (as well as other parts), so that a valve chamber 1c is sealed by the main diaphragm 2 and its attachments.

In FIG. 1, the numeral 8 designates a bonnet insert interposed between the main diaphragm 2 and the bonnet 4, 9 designates a seat fitted into the disk 7, 10 designates an O-ring for sealing a space between the bonnet 4 and the stem 5, 11 designates a plate for indicating opening and closing of the valve, 12 is a name plate, and 13 is a set screw.

The aforementioned body 1 is formed into almost a block-like shape using a metallic material such as stainless steel, an inflow passage 1a and an outflow passage 1b, are respectively formed at both sides thereof, and a concave valve chamber 1c is formed in the upper part thereof connected to the passages 1a, 1b, with the upper part thereof opening upwardly. A bottom surface of the valve chamber 1c is tapered to form a valve seat 1d in the vicinity of an opening of the inflow passage 1a. Further, a surface of an inner circumference of the valve chamber 1c is formed to have a step portion 1e on which an outer circumferential edge portion of the main diaphragm 2 is placed. A female thread portion 1f is formed above the foregoing step portion 1e, where the bonnet 4 is screwed into the body 1.

The aforementioned metallic main diaphragm 2 is fabricated by laying on top of one another a plurality of very thin metallic plates (of 0.1 mm to 0.2 mm thick, for example, being made from materials such as stainless steel (such as SUS316L) and Inconel (brand name)), with a center portion thereof bulging upwardly to be formed into an inverted dish-like shape, there being at a center portion of the main diaphragm 2 a mounting hole 2a through which a shaft portion 7b of a disk 7, to be described later, is inserted. An outer circumferential edge portion of this main diaphragm 2 is placed on the step portion 1e of the body 1, and, by screwing the bonnet 4 to the body 1 toward a surface of the body 1, the main diaphragm 2 is securely held under the bonnet 4, in an airtight state between the step portion 1e of the body 1 and the bonnet insert 8.

The number of plates forming the main diaphragm 2 is determined by a pressure of fluid being controlled, with this number increasing for higher pressure fluids.

Figure 4:
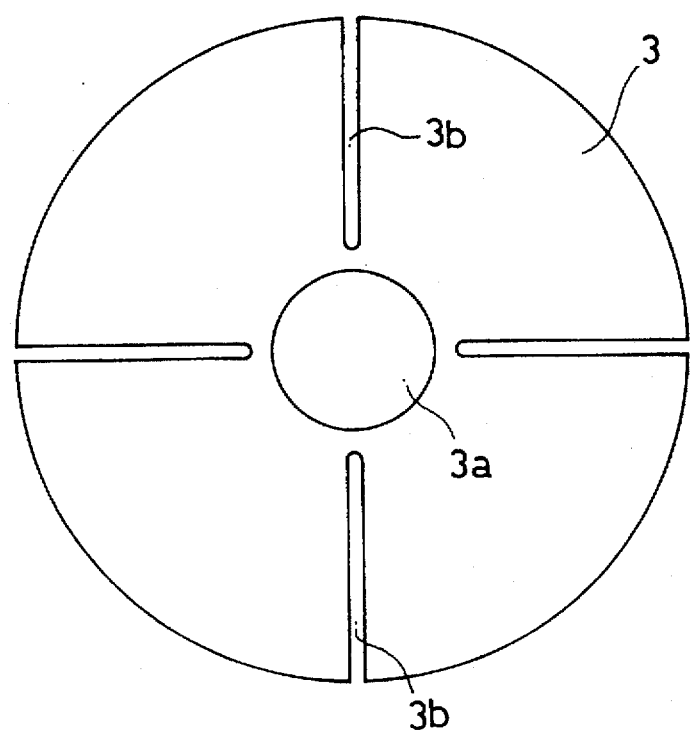
FIG. 4 is a top view of a sub-diaphragm which could be used in the first embodiment.

The aforementioned metallic sub-diaphragm 3 is made up of very thin metallic plates (of 0.1 mm to 0.2 mm, for example) with a center portion thereof being formed into a dish-like shape bulging downwardly and made from materials such as stainless steel (such as SUS316L) and Inconel (brand name). This sub-diaphragm 3 is arranged on a top surface of the main diaphragm 2 to support a bend in the main diaphragm 2. At the center portion of the sub-diaphragm 3 is formed a mounting hole 3a through which the shaft portion 7b of the disk 7, to be described later, is inserted. The inside diameter of the foregoing mounting hole 3a is the same as that of the mounting hole 2a of the main diaphragm 2. Further, as shown in FIG. 4, at the edge of an outer circumference of the sub-diaphragm 3 are formed radial slits 3b (four slits 3b in this embodiment) spaced at equal angles for adjusting a degree of bend, or of elastic force, of the sub-diaphragm 3.

The number, length, width, shape and the like of the slits 3b to be formed in the sub-diaphragm 3 are selected so that when the sub-diaphragm 3 supports the bend of the main diaphragm 2, the outer circumferential edge portion of the sub-diaphragm 3 can be elastically deformed upwardly without applying an excessive stress to the main diaphragm 2.

The aforementioned bonnet 4 is formed into almost a cylindrical shape from a metallic material, such as stainless steel. On the surface of an outer circumference of the bonnet is formed a male thread portion 4a to be screwed into the body 1, and on the surface of an inner circumference thereof is formed a female thread portion 4b to be screwed onto the stem 5. The bonnet 4 is fixed to the body 1 by screwing the male thread portion 4a thereof into the female thread portion 1f of the body 1 and tightening it against the surface of the body 1. As a result, an outer circumferential edge portion of the main diaphragm 2 is securely held in airtight state between the bonnet 4 and the body 1.

The aforementioned stem 5 is formed to have a shaft-like shape with steps from a metallic material such as stainless steel, and on a surface of an outer circumference thereof is formed a male thread portion 5a to be screwed into the female thread portion 4b of the bonnet 4. The stem 5 is rotatable and movable, upwardly and downwardly, in the female thread portion 4b of the bonnet 4, and a handle is installed on a top end portion thereof by means of a set screw 13. At a lower end portion of the stem 5 is formed a cavity 5b into which a connecting portion 7c of the disk 7, to be described below, is fitted for rotational movement, but to be unmovable in an axial direction.

The aforementioned disk 7, with a cross section thereof being formed into almost an inverted letter T from a metallic material such as stainless steel, is composed of: a seat portion 7a having a disk-like shape with a large diameter; an annular seal 9 fitted on a bottom surface of the seat portion 7a for making contact with, and moving away from, the valve seat 1d; the shaft portion 7b connected to a center portion of a top surface of the seat portion 7a and being inserted through mounting holes 2a and 3a of the main diaphragm 2 and the sub-diaphragm 3 and provided with a male thread portion 7d formed on a top end portion; and the connecting portion 7c having almost a disk-like shape screwed on the male thread portion 7d of the shaft portion 7b and fitted into the cavity 5b of the stem 5 to be rotatable, but immovable in an axial direction.

In a portion of a surface of an outer circumference of the shaft portion 7b of the disk 7, spaced a fixed distance from a top surface of the seat portion 7a, is formed a step portion 7e on which inner circumferential edge portions of the main diaphragm 2 and the sub-diaphragm 3 are place.

Figure 2:
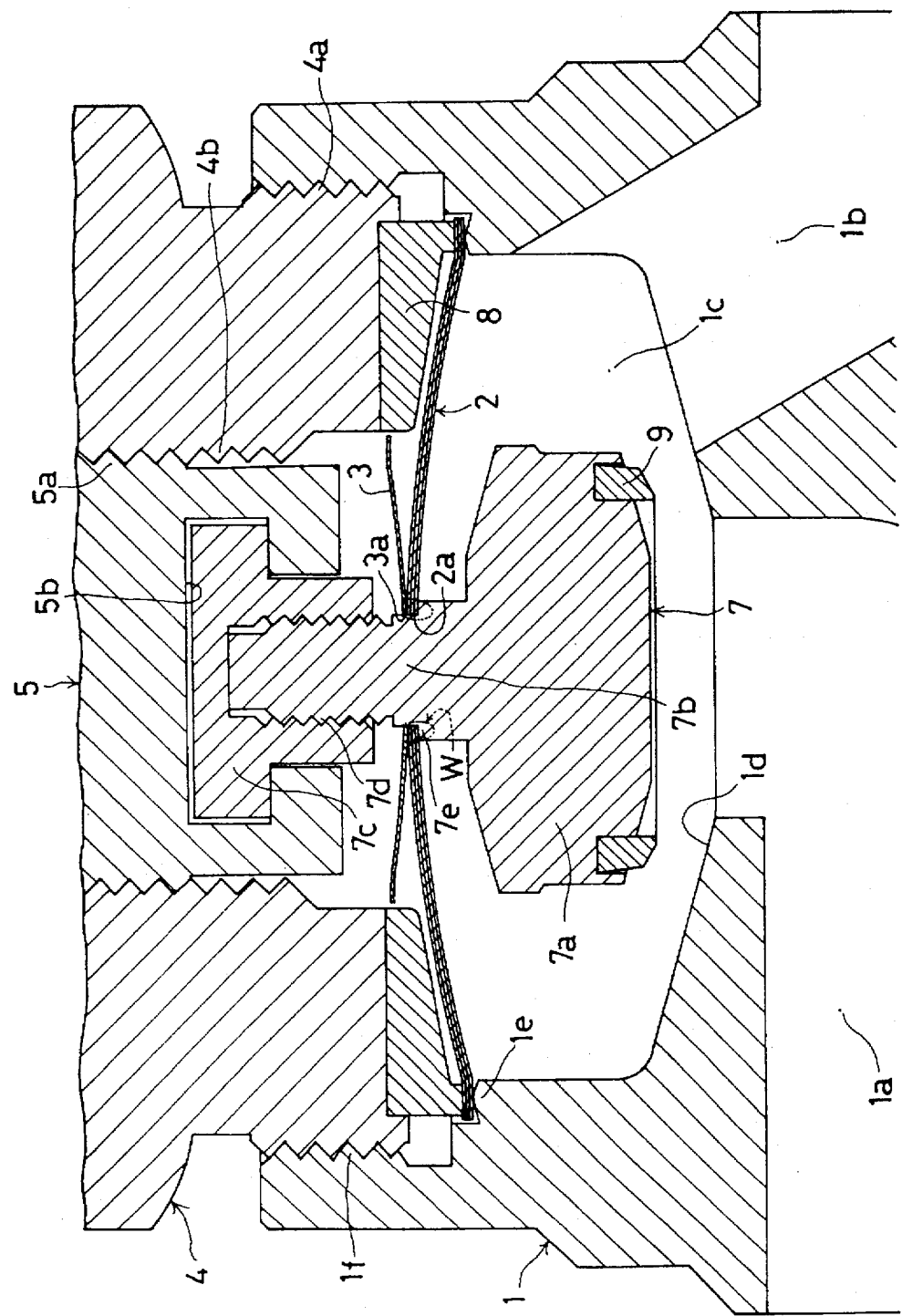
FIG. 2 is an enlarged, segmented, longitudinal cross-sectional view of an important part of the diaphragm valve of the first embodiment.
Figure 3:
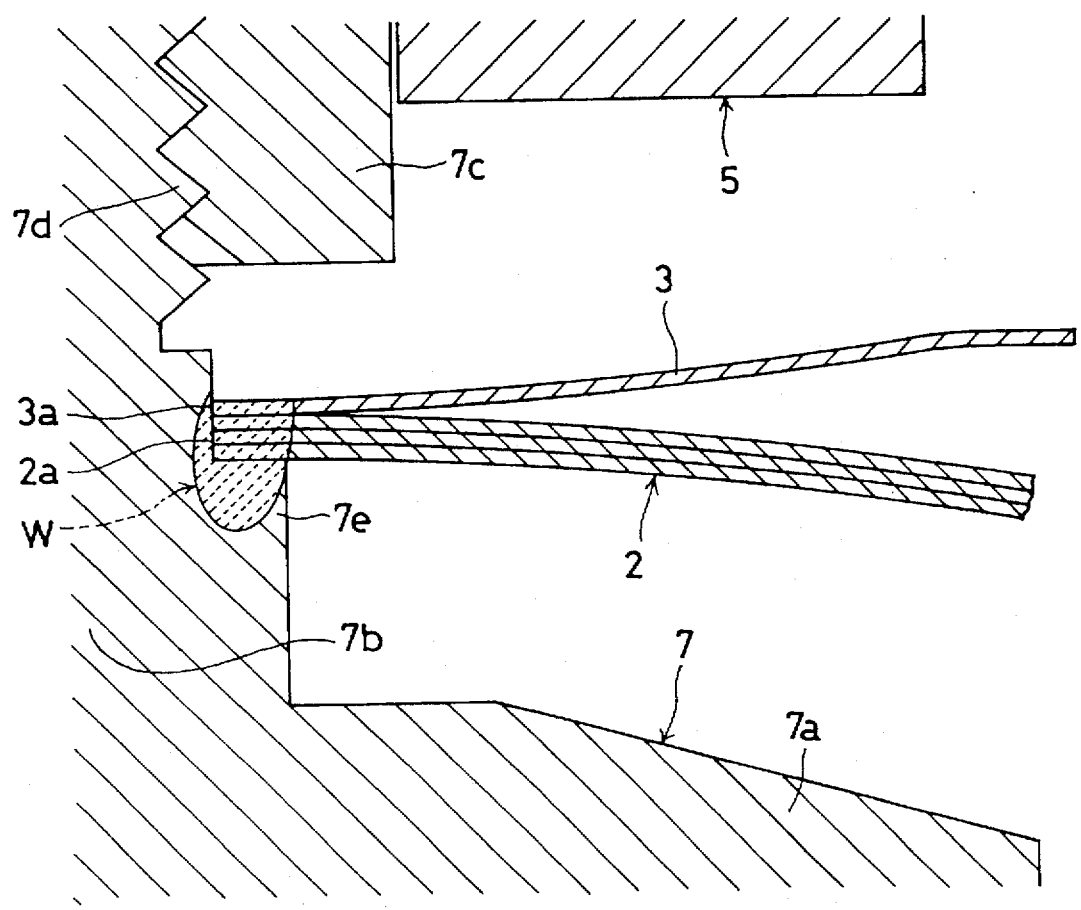
FIG. 3 is an enlarged, segmented, longitudinal cross-sectional view of a welded portion of each diaphragm and the disk of the diaphragm valve of the first embodiment.

The inner circumferential edge portions of the aforementioned main diaphragm 2 and the sub-diaphragm 3 and the shaft portion 7b of the disk 7 are fastened and integrated by a welding W. That is, as shown in FIG. 2 and FIG. 3, the shaft portion 7b of the disk 7 is inserted through the mounting holes 2a and 3a from the bottom side of the diaphragms 2 and 3 to allow the step portion 7e to make contact with the bottom side of the inner circumferential edge portion of the main diaphragm 2. The contacting portions (the edge portions of the main diaphragm 2 and the sub-diaphragm 3 and the portion of the step portion 7e of the shaft portion 7b) are welded around the entire circumference by electron beam welding at W thereby fastening and integrating these three components.

As a matter of course, the conditions under which the electron beam welding is conducted are selected such that the diaphragms 2 and 3 and the disk 7 are securely welded without causing welding defects and are not subject to deformation or distortion.

This electron beam welding is suitable for the aforementioned welding because it has features such as (1) producing minimum deformation and distortion in the weld zone due to small welding heat input, (2) producing precision welds due to having a narrow weld zone, and (3) providing the capability of welding thick pieces due to producing deep melt penetrations.

In the aforementioned diaphragm valve, when the stem 5 is lowered by operating the handle 6, the disk 7 is lowered gradually and the center portion of the main diaphragm 2 is also deformed elastically in the downward direction.

Figure 5:
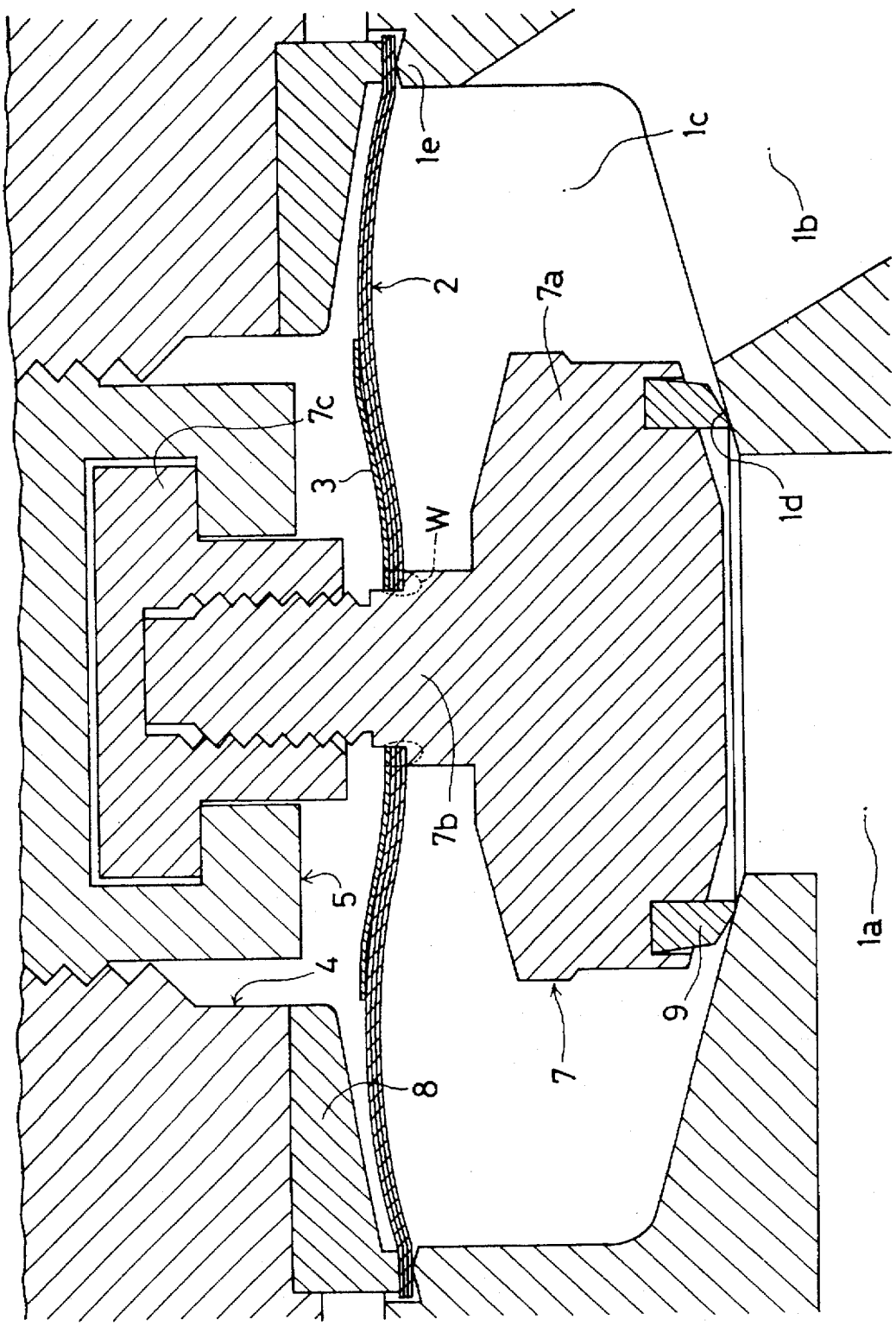
FIG. 5 is an enlarged, segmented, longitudinal cross-sectional view of an important part of the first embodiment showing a main diaphragm and a sub-diaphragm thereof being deformed elastically.

As the center portion of the main diaphragm 2 is gradually deformed elastically downwardly, the bottom surface of the sub-diaphragm 3 gradually comes into contact with the top surface of the main diaphragm 2, beginning with the edge of the inner circumference of the bottom surface of the sub-diaphragm 3, so that a bend of the main diaphragm 2 will be supported by the sub-diaphragm 3 (see FIG. 5). As a result, it is possible to prevent bending stress generated during bending of the main diaphragm 2 from being directly applied to the weld zone and to prevent a sharp bend from occurring in the main diaphragm 2. When the sub-diaphragm 3 supports the bend of the main diaphragm 2, the outer circumferential edge portion of the sub-diaphragm 3 is gradually deformed elastically upwardly. For this reason, no excessive stress is applied to the main diaphragm 2.

As a result, there will be no large stress applied at the weld zone of the main diaphragm 2 nor will there be an excessive stress applied to other portions of the main diaphragm 2, thereby extending the useful life of the main diaphragm 2.

When the stem 5 is lowered by a fixed stroke, the seat 9 provided in the disk 7 comes into contact with the seat valve 1d to close communication between the inflow passage 1a and the outflow passage 1b.

The amount of displacement of the main diaphragm 2 is selected so that the center portion of the inverted dish-like main diaphragm 2 is not reversed, or inverted, downwardly.

On the other hand, when the stem 5 is raised by operating the handle 6, the disk 7 is raised gradually, so that the main diaphragm 2 gradually returns to its initial shape due to elastic forces in the main diaphragm 2. As a result, the seat 9 moves away from the valve seat 1d, thereby opening a passage space between the inflow passage 1a and the outflow passage 1b.

As the main diaphragm 2 returns to its initial shape, the sub-diaphragm 3 also gradually returns to its initial shape due to elastic forces in the sub-diaphragm 3.

In the diaphragm valve of the embodiment described above, because the inner circumferential edge portion of the main diaphragm 2 is fixed to the shaft portion 7b of the disk 7 at a position (portion of the step portion 7e) spaced upwardly from the seat portion 7a, there will be no narrow space formed between the bottom surface of the main diaphragm 2 and the top surface of the disk 7 in which fluid is trapped. As a result, gas substitution will be greatly improved.

In this diaphragm valve, because the diaphragms and the shaft portion 7b of the disk 7 are welded at the weld W by a welder directed from the upper side of the sub-diaphragm 3 in order to fix and integrate these parts, metallic components and the like evaporated during the welding will not attach to portions (underside of the metallic diaphragm 2, for example) which subsequently contact fluid. As a result, it is possible to prevent deterioration of purity of fluid flowing through the diaphragm valve. In addition, only one step, or time, welding is necessary in this case, and work efficiency is also thereby improved.

Figure 6:
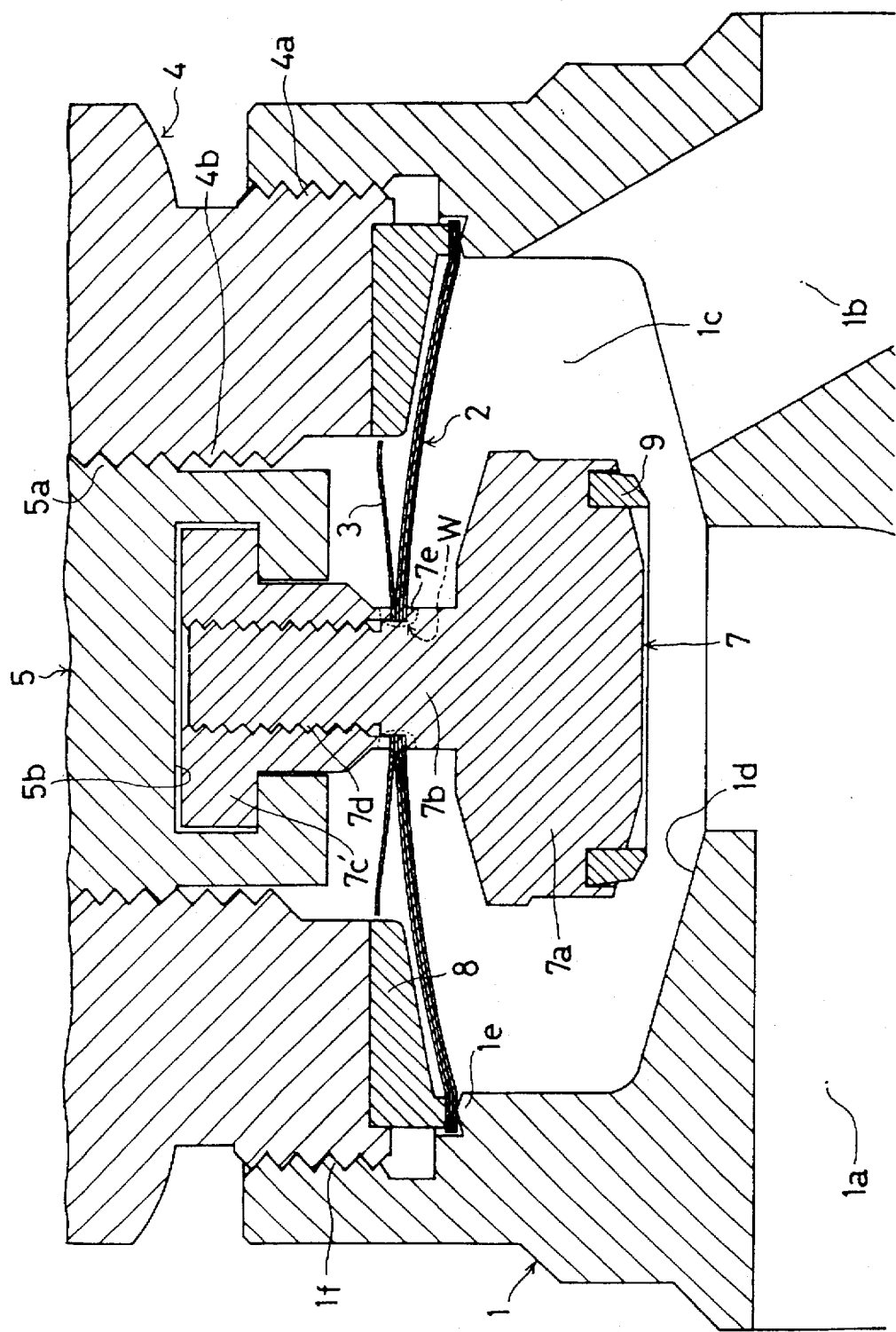
FIG. 6 is an enlarged, segmented, longitudinal cross-sectional view of an important part of a diaphragm valve according to a second embodiment of the present invention.

FIG. 6 is an expanded sectional view showing a main part of a diaphragm valve of a second embodiment according to the present invention (which is an example of a modified diaphragm valve of the first embodiment described above), in which the inner circumferential edge portions of the main diaphragm 2 and the sub-diaphragm 3 are fastened together by the step portion 7e of the shaft portion 7b and a bottom end surface of a modified connecting portion 7c', and the fastened portions (the inner circumferential edge portion of each diaphragm 2 and 3, the step portion 7e of the shaft portion 7b, and the bottom end portion of the connecting portion 7c') are welded at the weld W around the entire circumference by an electron beam directed from both above and below in order to fasten and integrate these three parts. Other elements are arranged in the same manner as for the diaphragm valve of the first embodiment of above.

In FIG. 6, the numeral 1 represents the body, 1a the inflow passage, 1b the outflow passage, 1c the valve chamber, 1d the valve seat, 1e the step portion, if the female thread portion, 4 the bonnet, 4a the male thread portion, 4b the female thread portion, 5 the stem, 5a the male thread portion, 5b the cavity portion, 8 the bonnet insert, and 9 the seat (or seal).

This diaphragm valve also capable of demonstrating the same operational effects as the diaphragm valve of the first embodiment of above. Especially, because the inner circumferential edge portion of each diaphragm 2 and 3 can be held during welding thereof by the step portion 7e of the shaft portion 7b and the bottom end surface of the connecting portion 7c', welding work can be carried out easily.

In each of the above embodiments, the main diaphragm 2 is constructed of a plurality of very thin metallic plates, but the main diaphragm 2 may be constructed as one piece of a thin metallic plate. In this case, the same operations and effects as described above can be achieved.

In each of the above embodiments, four slits 3b are formed in the sub-diaphragm 3, but the number, length, shape and the like of the slits 3b are not limited to those of the above embodiments. Any number, length, shape and the like may be selected as long as a required degree of bend can be demonstrated, according to a material (amount of elastic deformation and the like) of the main diaphragm. The slit(s) 3b of sub-diaphragm 3 may not be necessary.

Figure 7:
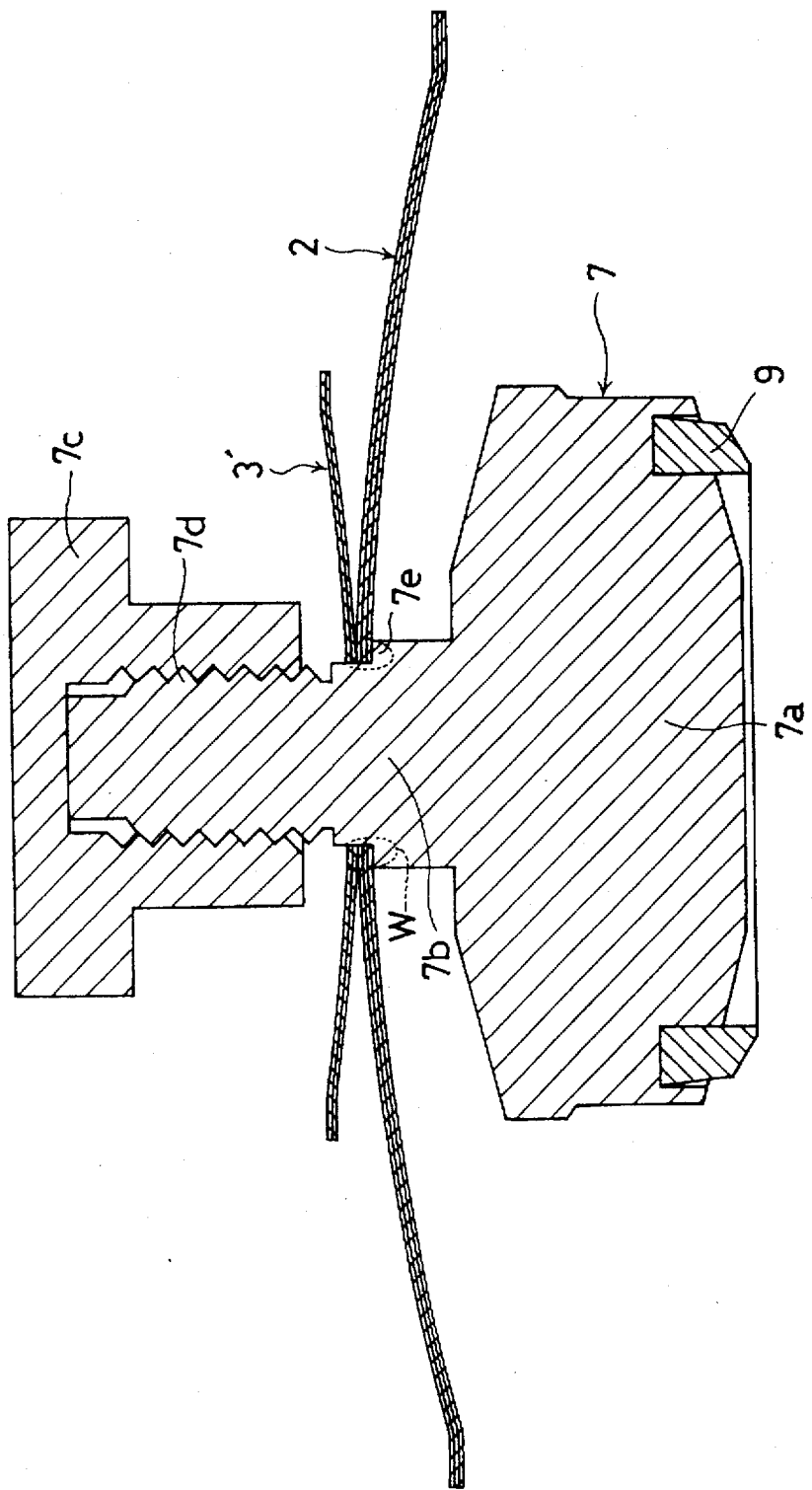
FIG. 7 is an enlarged, segmented, longitudinal cross-sectional view similar to that of FIG. 2, but of an embodiment in which a sub-diaphragm is composed by a plurality of metallic plates.

In each of the above embodiments, the sub-diaphragm 3 is formed as one piece of a very thin metallic plate, but in other embodiments, a sub-diaphragm 3' may be formed of a plurality of very thin metallic plates laid one on top of another as shown in FIG. 7.

In each of the above embodiments, the shaft portion 7b of the disk 7 is inserted into the center portion of each diaphragm in order to fasten and integrate the end inner circumferential edge portion of each diaphragm 2 and 3 and the shaft portion 7b by welding. But, in other embodiments, the present invention may be applied to a direct type diaphragm valve.

Figure 8:
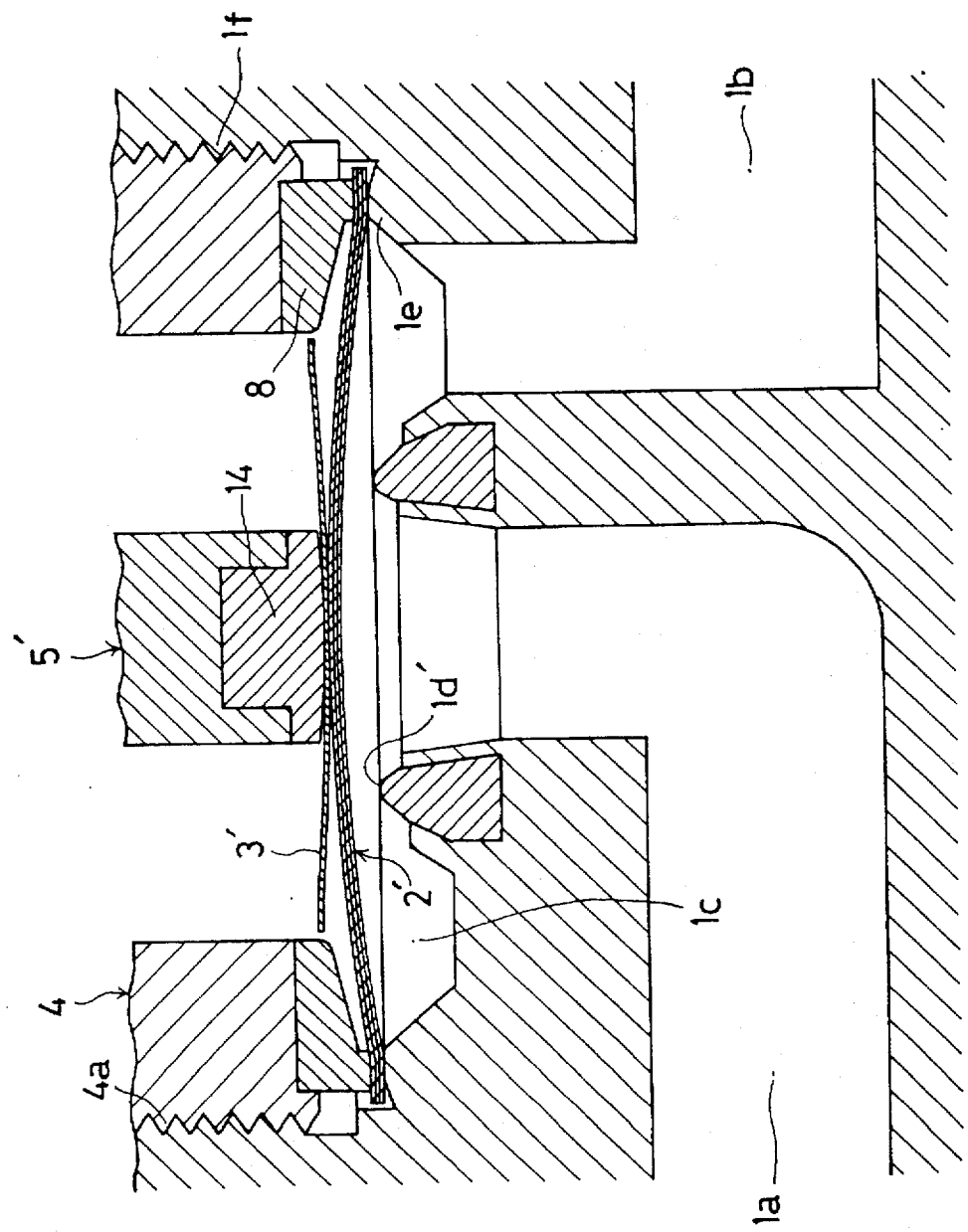
FIG. 8 is an enlarged, segmented longitudinal cross-sectional view similar to that of FIG. 2, but in which the present invention is applied to a direct type diaphragm valve.
Figure 9:
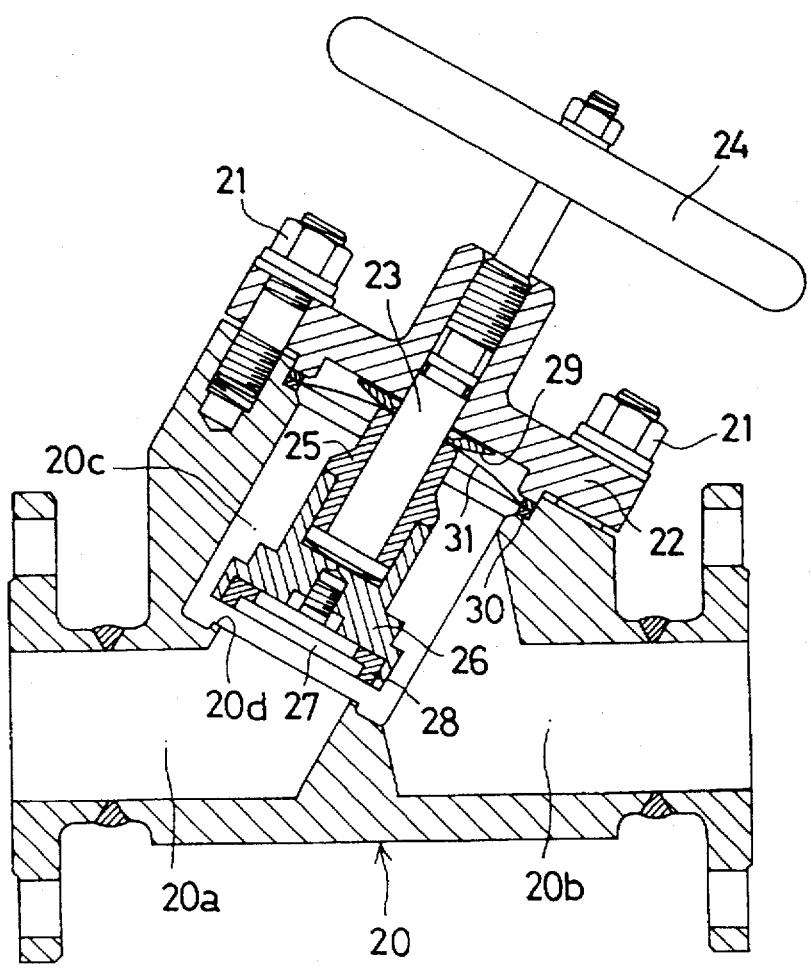
FIG. 9 is a longitudinal cross-sectional view of a prior-art conventional diaphragm valve.
Figure 10:
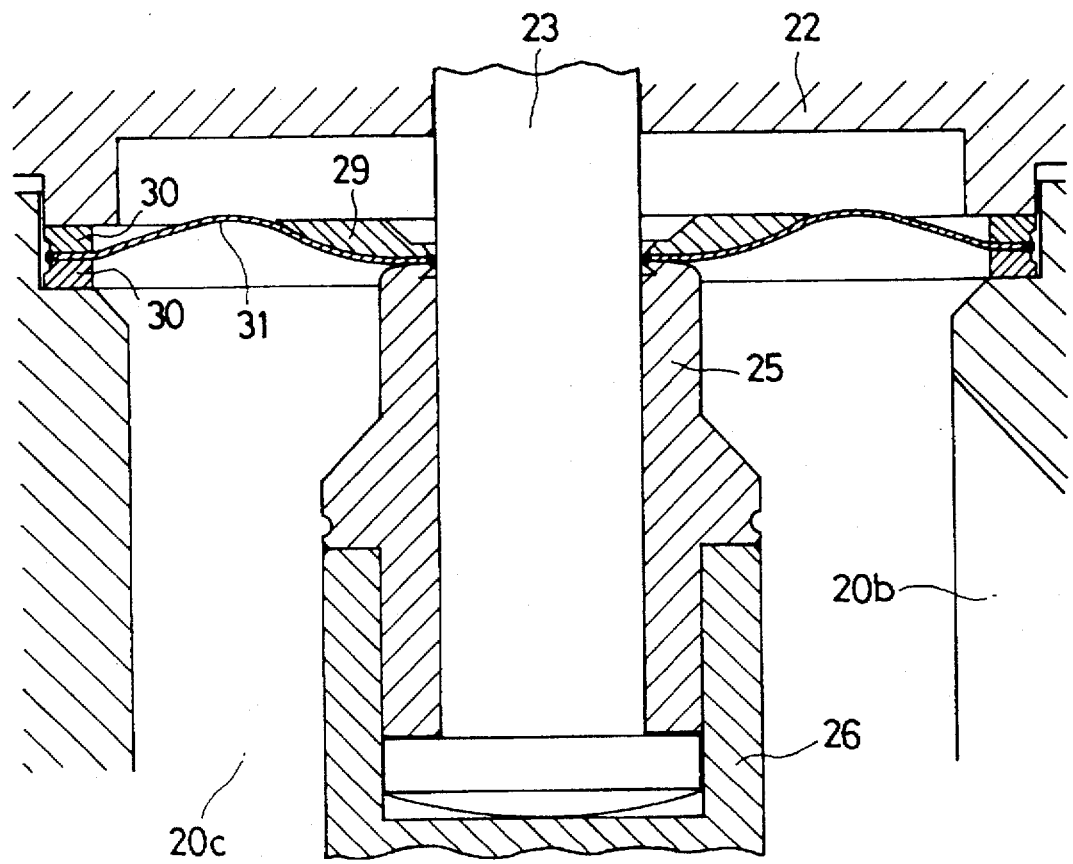
FIG. 10 is an enlarged, longitudinal cross-sectional view of an important part of a diaphragm of a prior-art conventional diaphragm valve which is deformed elastically.

That is, as shown in FIG. 8, a center portion of a dish-type sub-diaphragm 3' may be fixed and integrated by welding it to a center portion of a top surface of an inverted dish-type main diaphragm 2' arranged inside the valve chamber 1c for directly contacting and moving away from the valve seat 1d', so that a bend of the main diaphragm 2' is supported by the sub-diaphragm 3'. In FIG. 8, 1a represents the inflow passage, 1b the outflow passage, 1e the step portion, 1f the female thread portion, 4 the bonnet, 4a the male thread portion, 5' a stem, 8 the bonnet insert, and 14 a diaphragm holder for pressing down the diaphragms 2 and 3.

In each of the above embodiments, the stem 5, 5' is designed to be moved up and down manually, but the stem 5 may be moved up and down automatically using an actuator (not shown) of a fluid pressure cylinder and the like.

In the above embodiments, each diaphragm 2 and 3 and the disk 7 are fastened and integrated by electron beam welding, but they may be fastened and integrated by other welding methods (laser welding, for example).

As is stated above, for the diaphragm valve of this invention, because the metallic sub-diaphragm whose outer-circumference edge portion is elastically deformable in a vertical direction is arranged at the top surface of the metallic main diaphragm (which main diaphragm directly or indirectly makes contact with and moves away from the valve seat) so that a bend of the main diaphragm is supported by the sub-diaphragm, the outer-circumference edge portion of the sub-diaphragm is gradually deformed elastically upwardly as the bend of the main diaphragm is supported by the sub-diaphragm. As a result, there will be no excessive stress applied to the main diaphragm, and the useful life of main diaphragm will be extended.

By forming radial slits spaced from each other at a circumferential portion of the sub-diaphragm, or by constructing the sub-diaphragm by laying a plurality of metallic plates on top of another, a degree of bending of the sub-diaphragm can be easily adjusted, depending on the material, elastic force and the like of the main diaphragm used.

While the invention has been particularly shown and described with reference to a preferred embodiment, it will be understood by those of ordinary skill in the art that various changes in form and detail may be made therein without departing from the spirit and scope of the invention.

The invention claimed is:

1. A diaphragm valve comprising:

a body defining a concave valve chamber having a valve seat at a bottom thereof, said valve chamber being interconnected to an inflow passage and an outflow passage;

a metallic main diaphragm provided in the valve chamber opposite the valve seat for maintaining airtightness of the valve chamber and being elastically deformable in a vertical direction to seal and unseal the valve seat and thereby disconnect and connect the inflow and outflow passages;

a bonnet fixed to the body for securely holding an outer circumferential edge portion of the main diaphragm against the body; and a stem supported by the bonnet to move up and down therethrough for elastically deforming the main diaphragm;

wherein at a top surface of said main diaphragm is arranged a metallic sub-diaphragm having an outer circumferential edge portion which is elastically deformable in the vertical direction, and a center portion which is fixed relative to a center portion of the main diaphragm, so that the sub-diaphragm can contact the top surface of the main diaphragm to support a bend of the main diaphragm when it is elastically deformed.

2. A diaphragm valve according to claim 1, wherein radial slits are formed at the outer circumferential edge portion of the sub-diaphragm, spaced at equal angles.

3. A diaphragm valve according to claim 1, wherein said main diaphragm is constructed by laying a plurality of metallic sheets on top of one another.

4. A diaphragm valve according to claim 1, wherein center portions of the main diaphragm and the sub-diaphragm define mounting holes;

wherein is further included a disk having a shaft portion, said shaft portion of said disk being inserted through said mounting holes; and wherein edge portions of inner circumferences of the main diaphragm and the sub-diaphragm defining said mounting portions are welded to an outer-circumference surface of the shaft portion by beam welding.

5. A diaphragm valve according to claim 4, wherein a step portion is formed on the outer-circumference surface of the shaft portion of the disk, so that the inner-circumference edge portions of the main diaphragm and sub-diaphragm are welded to the step portion.

6. A diaphragm valve according to claim 1, wherein said sub-diaphragm is constructed by laying a plurality of metallic sheets on top of one another.

* * * * *